Mar. 20, 1923.
J. B. BARTHOLOMEW
MOTOR PROPELLED LISTER CULTIVATOR
Filed July 3, 1917
1,448,991
2 sheets-sheet 1
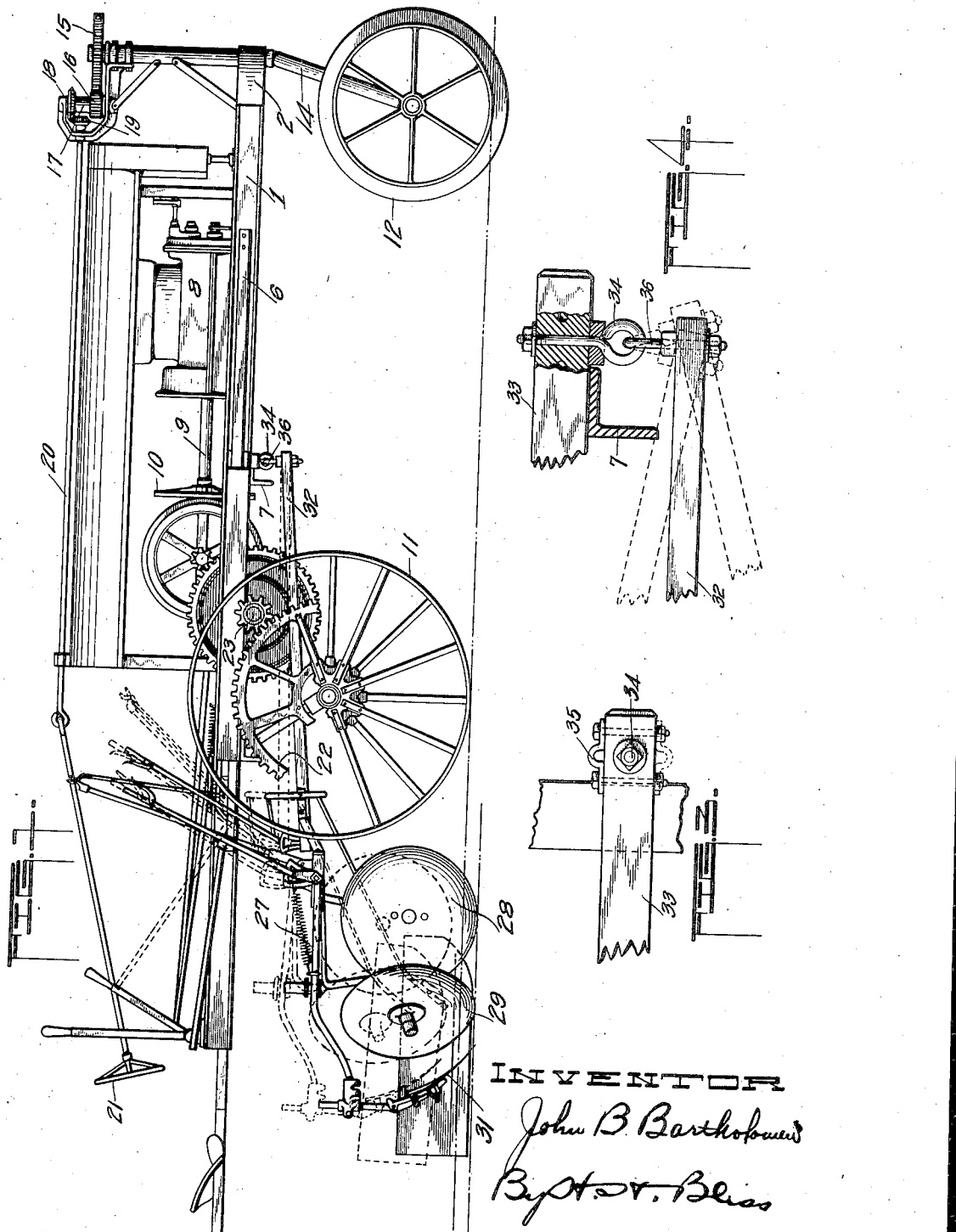
INVENTOR
John B. Bartholomew
By Stor. Bliss
ATTY

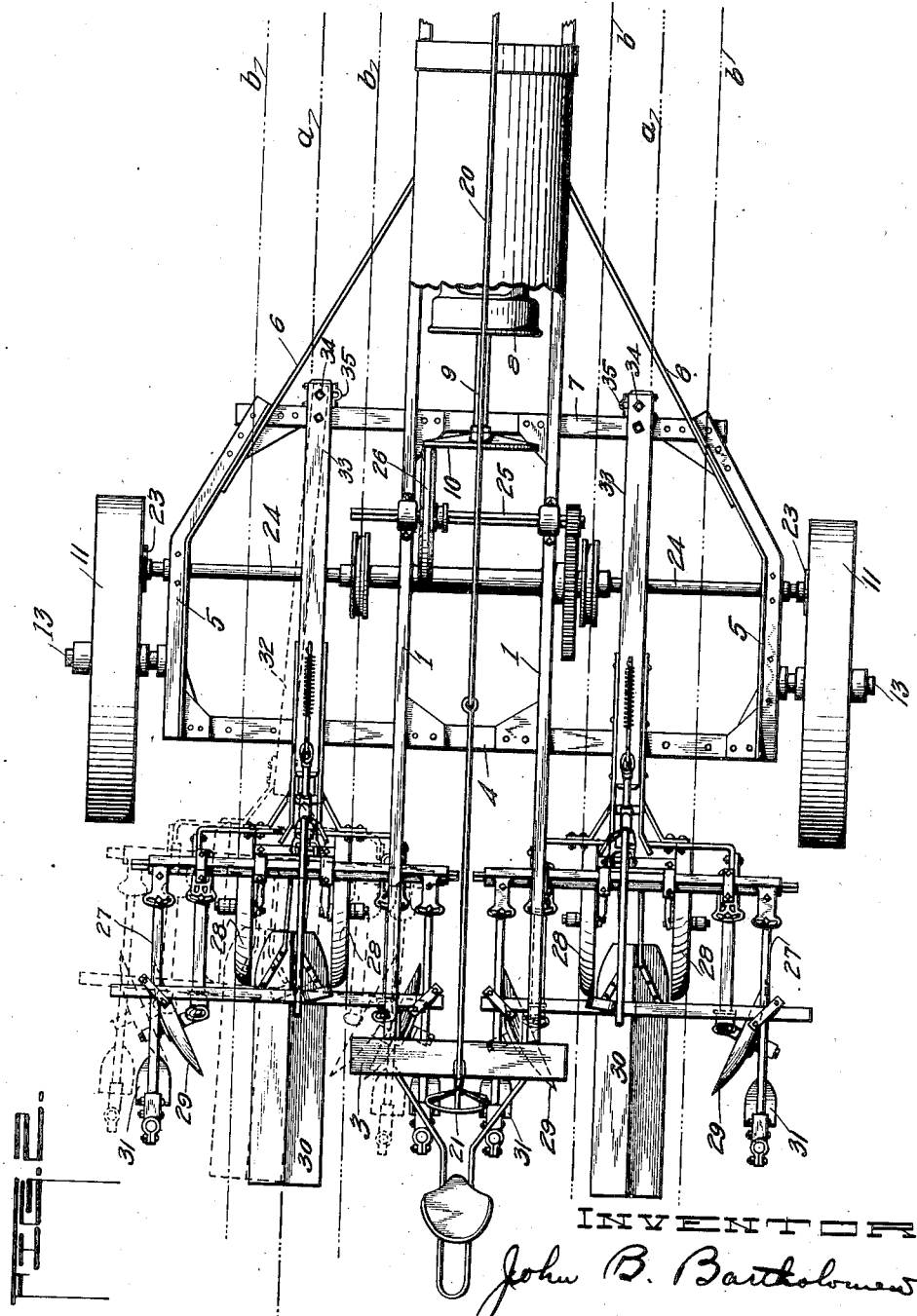

Patented Mar. 20, 1923.

1,448,991

UNITED STATES PATENT OFFICE.

JOHN B. BARTHOLOMEW, OF PEORIA, ILLINOIS, ASSIGNOR TO AVERY CO., OF PEORIA, ILLINOIS, A CORPORATION OF ILLINOIS.

MOTOR-PROPELLED LISTER CULTIVATOR.

Application filed July 3, 1917, Serial No. 178,446. Renewed February 18, 1922. Serial No. 537,643.

*To all whom it may concern:*

Be it known that I, JOHN B. BARTHOLOMEW, a citizen of the United States, a resident of Peoria, in the county of Peoria and State of Illinois, have invented new and useful Improvements in Motor-Propelled Lister Cultivators, of which the following is a specification.

In the cultivation of certain crops, listed corn, for instance, peculiar conditions are met with making it difficult to simultaneously use two or more cultivators for working between more than two rows of growing plants, owing to the fact that in seeding but a single row is planted at one time; and these being more or less irregular, it follows that the rows are not parallel, being closer together at some places and farther apart at others, and the irregularities between several adjacent rows being not the same in each.

The present invention has for its object to produce a cultivating machine, particularly one that is motor-propelled, that is provided with a plurality of cultivating implements so constructed and connected with the draft frame, that they are freely movable laterally and will automatically follow the minor irregularities of the rows, without regard to the course of the draft frame, which must be steered with reference to the general course of a row or pair of rows being followed. In operating with a machine such as I have invented I avail myself of the ridges and furrows that are produced in the planting operations, as has been suggested, these being utilized, since they correspond with the sinuosities of the individual rows, to automatically determine the courses of the individual cultivating instruments, leaving the operator of the machine free to direct the general course thereof.

In the accompanying drawings, Fig. 1 is a side elevation of a preferred form of motor-propelled machine embodying my invention and adapted for the cultivation of listed corn.

Fig. 2 is a plan view of Fig. 1, part of the machine broken away, and showing in a diagrammatic manner, furrows previously formed by a lister planter.

Fig. 3 is a plan view of the forward end of a beam of the motor propelled machine showing coupling members for attaching the tongue of the lister cultivator, thereto, and Fig. 4 is a detail side elevation, partly in section, showing the manner of coupling the tongue of the lister cultivator to the motor propelled machine, whereby a universal joint is obtained.

Like characters of reference denote corresponding parts throughout the figures.

I have disclosed in the drawings, a preferred form of motor propelled machine, being substantially similar to that described and claimed in my co-pending application, bearing Serial Number 154,820, filed on or about the 14th day of March, 1917; and with such motor-propelled machine or draft frame there are combined a plurality of cultivating parts, those represented being lister cultivators arranged and adapted to cultivate both sides of two rows of listed corn, such cultivating instruments being typical of others as may be used and still come within the purview of my invention. These cultivating instruments are arranged in gangs and are provided with short tongues between which and the draft frame are coupling means of such character as to permit the cultivating instruments to be drawn over the ground by said motor propelled machine, while at the same time permitting the gangs to be swung towards or from each other freely, and also to be raised up and down. No claim is made in this application to the specific form of motor propelled machine or the lister cultivators.

It is a well known fact as has been already stated that lister planted rows are usually planted, one row at a time, and therefore are more or less irregular; that is, not exactly parallel. To handle a lister cultivator, in which the cultivating tools are arranged in gangs supported in independent frames, it is necessary that the cultivating parts of each attachment be able to move toward and from the other so as to adapt themselves to the widths of the rows of corn regardless of their being closer together or farther apart.

In describing the motor propelled machine as well as the lister attachments the parts and mechanisms will be referred to in a general way, because the motor propelled machine is referred to more specifically in said copending application and said lister attachments are of a general construction.

The frame of the motor propelled machine includes preferably the parallel spaced beams 1, 1 connected at their forward ends by the curved strap 2, and at their rear ends by the cross-bar 3; also, the triangular shaped frame, including the parts 4, 5, 5, 6, 6 and 7.

The motor is designated 8, being preferably a gasoline engine of any suitable construction, and mounted on the beams 1, 1 in any suitable manner. The driving shaft 9 of the engine has connected thereto the friction driving wheel or disc 10.

11 11 designate the two main traction or driving wheels and 12 the single centrally disposed steering wheel. The wheels 11 are preferably loosely journaled on shafts 13 which are secured to the frame part 5, and the steering wheel is preferably loosely journaled on the horizontal portion of a vertically disposed shaft 14. On the upper end of said shaft 14 is a gear wheel 15 and meshing therewith, is a pinion 16 carried on one end of a short shaft 17. On the opposite end of said shaft 17 is carried a bevel pinion 18 meshing with a bevel pinion 19 on the forward end of a longitudinally disposed steering shaft 20. Connected with the rear end of said steering shaft 20 is an operator's wheel 21, by means of which the operator has full control of the wheel 12 at all times.

Secured to each driving wheel 11 is a driving gear wheel 22 and in mesh with the teeth of said gear wheels 22, and adapted to impart movement thereto are driving pinions 23 secured on the outer ends of shaft sections 24 and said shaft sections 24 are suitably geared to a shaft 25 on which is preferably slidably carried the friction driven wheel 26 adapted to have an impinging frictional relation with the face of the driving disc 10. As previously stated, full detail statements of the construction and operation of the motor propelled machine are set forth in my said copending application.

27, 27 designate generally the gangs of a pair of lister cultivators comprising the wheels 28, 28 employed to run in the furrows formed in the soil by the planter on either side of the row of planted seeds; the cultivating discs 29, 29, covering boards 30, shovels 31, 31 and other elements, including the raising and lowering means common to devices of this character. Each lister has a tongue 32 which is relatively short and at its forward end carries means for attachment to the motor propelled machine, in a manner to be explained.

33, 33 designate a pair of parallel spaced beams disposed longitudinally of the motor propelled machine and connected to the frame parts 4 and 7. Preferably secured through the forward end of each beam 33 is an eye bolt 34, although the same may be secured to either side of the forward ends of such beams through the medium of the clips 35. The arrangement shown in Fig. 3 permits of adjusting the center line of pull of the lister attachments, as will be understood. Connected with the forward end of each tongue 32 is an eye bolt 36 which is coupled to an eye bolt 34. Such connection between the eye bolts 34 and 36 forms a universal joint permitting the lister gangs to be swung toward and away from each other freely, and also be raised up and down.

In Figure 2, the dotted lines $a$, $a$ designate the center of two rows planted by a lister, and the dotted lines $b$, $b$, $b$, $b$, represent the sides of the furrows made by the lister. In the operation of my machine, the wheels 28, 28 of the lister cultivator will run in the furrows and straddle of the rows of corn, the pressure of the sides $b$, $b$ on the wheels 28, 28 guiding the cultivator, so that the gangs will adapt themselves to the irregularities of the rows, all of which is permitted by the universal connection between the beams 33 and the tongues 32.

By making the tongues of the cultivator gangs short the machine, considered as a whole, is made compact, the cultivator gangs being thus brought up close to the rear of the draft or motor frame, and by having the universal joint connections between the draft frame and the tongues of the respective cultivating instrumentalities close to the latter the cultivators are found to readily and automatically follow the minor sinuosities of the individual rows without attention on the part of the operator, who is thus left free to direct the general course of the machine as a whole, which he steers as near as may be along a line midway between the rows $a$—$a$ being cultivated.

What I claim is:—

1. A cultivating machine comprising a draft frame provided with means by which its course may be steered, a trailing cultivating implement connected with the draft frame by a joint permitting it to move laterally freely, the cultivating implement being provided with means for engaging with the soil and arranged to be directed by ridges and furrows therein parallel with the row of plants being cultivated, the said soil engaging means being movable laterally relative to said draft frame and with the cultivating implement and operating to automatically shift the cultivating instrument laterally to follow the minor sinuosities of the row being cultivated.

2. A cultivating machine comprising a draft frame provided with means by which its course may be steered, trailing cultivating implements connected with the draft frame by joints permitting them to independently move laterally freely, the cultivating implements being each provided with means for engaging with the soil and arranged to be directed by ridges and furrows therein parallel with the rows of plants being cultivated, the soil-engaging means being movable laterally relative to said draft frame and with the cultivating implements and operating to automatically shift the cultivating instruments laterally, independently one of the other to follow the minor sinuosities of the rows being cultivated.

3. A machine adapted to cultivate at one and the same time two rows of listed plants comprising a draft frame provided with means by which its course may be steered, cultivating implements connected with the draft frame by universal joints permitting them to independently move both laterally and vertically freely, the cultivating implements being arranged side by side and each carrying means that are laterally movable relative to said draft frame and engage with the soil and are directed by the ridges and furrows that are parallel with the rows of plants being cultivated, which means operate to automatically shift the cultivating implements laterally so they independently follow the minor sinuosities of the rows being cultivated, and means by which the cultivating implements may be vertically adjusted.

4. A cultivating machine comprising a draft frame provided with means by which its course may be steered, cultivating implements each provided with a short tongue, loose joints uniting the forward ends of the tongues of the cultivating implements with the draft frame permitting the implements to freely move laterally with reference to each other, and to the general course of the machine, and wheels carried by the cultivating implements and movable therewith laterally relative to said draft frame for engaging with the ridges and furrows in the soil that parallel the rows of plants, arranged to automatically laterally shift the cultivating implements so they follow the minor sinuosities of the rows being cultivated as the machine moves along the rows.

JOHN B. BARTHOLOMEW.